JOHN B. WELPTON.
Tug Clip.

No. 125,237.  Patented April 2, 1872.

Witnesses:
A Bennerendorf.
Geo. W. Mabee

Inventor:
J. B. Welpton
PER
Mmm/G
Attorneys.

UNITED STATES PATENT OFFICE.

JOHN B. WELPTON, OF TABOR, IOWA.

IMPROVEMENT IN TUG-CLIPS.

Specification forming part of Letters Patent No. 125,237, dated April 2, 1872.

Specification describing a new and Improved Adjustable Hame Tug-Clip, invented by JOHN B. WELPTON, of Tabor, in the county of Fremont and State of Iowa.

Figure 2:
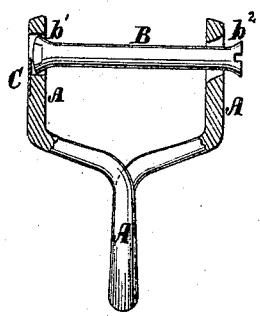
Figure 1:
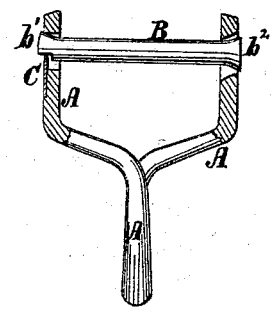
Figure 3:
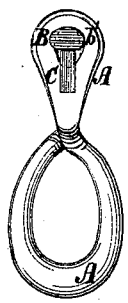
Figure 4:
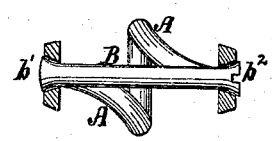

Figure 1 is a detail sectional view of my improved hame tug-clip, showing the bolt locked in place. Fig. 2 is the same view as Fig. 1, but showing the bolt partly removed. Fig. 3 is an edge view of the same. Fig. 4 is a detail cross section of the same, showing the bolt in place.

Similar letters of reference indicate corresponding parts.

My invention has for its object to furnish an improved hame tug-clip, simple in construction, convenient and reliable in use, and which shall be so constructed as to allow it to be conveniently detached when desired for changing the hames or other purposes. And it consists in the hame tug-clip constructed as hereinafter more fully described.

A is the body or loop of the clip, which is bent or twisted, as shown in Figs. 1, 2, 3, and 4, to bring the loop that receives the hame-staple at right angles with the bolt B. B is the bolt, which passes through the eyes of the loop or body A. The bolt B is made with a head upon each end. The head $b^1$ upon the forward end is made oblong, and flaring upon two sides, and has a rabbet or shoulder formed upon the third side, as shown in Figs. 1 and 2, to receive the end of a small spring, C, attached to the arm of the body or loop A, as shown in Figs. 1 and 2 and 3. Both the holes or eyes of the body or loop A are made oblong, so that the oblong head $b^1$ of the bolt B may pass through them, and the forward hole is made flaring on its sides to correspond with the head $b^1$, as shown in Fig. 4, so that the bolt cannot come out when in use. In the other head, $b^2$, of the bolt B, is formed a slot or groove to receive a screw-driver for turning the bolt in inserting it and removing it. To remove the bolt, the point of some sharp-pointed instrument is inserted beneath the free end of the spring C, and said end is raised slightly, and, at the same time, the bolt B is turned one-quarter around, the head of the bolt passing beneath the end of the spring, and thus passing out freely. In inserting the bolt, the forward head of the bolt is passed through the holes or eyes of the loop or body A until it rests against the spring C, when a slight pressure and a one-quarter turn with a screw-driver brings it to its place.

The spring C does not require to be very strong as there is no strain upon it, its only office, when the clip is in use, being to keep the bolt B from turning.

Having thus described my invention, I claim as new and desire to secure by Letters Patent—

An improved hame tug-clip, formed by the combination of the twisted body or loop A, bolt B $b^1$ $b^2$, and spring C, said parts being constructed and operating in connection with each other, substantially as herein shown and described, and for the purposes set forth.

JOHN B. WELPTON.

Witnesses:
G. B. EASTMAN,
J. C. CORNELL.